Oct. 9, 1956
R. A. RAMEY, JR
2,766,420
MAGNETIC COINCIDENCE DETECTOR
Filed March 16, 1953
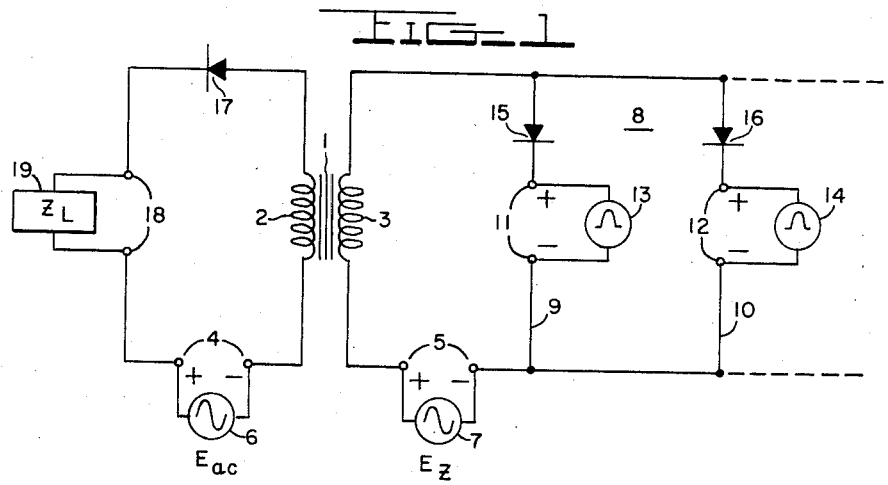
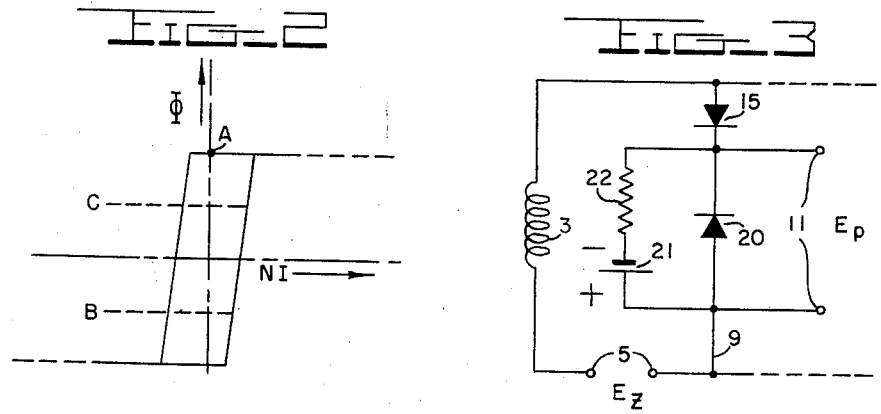
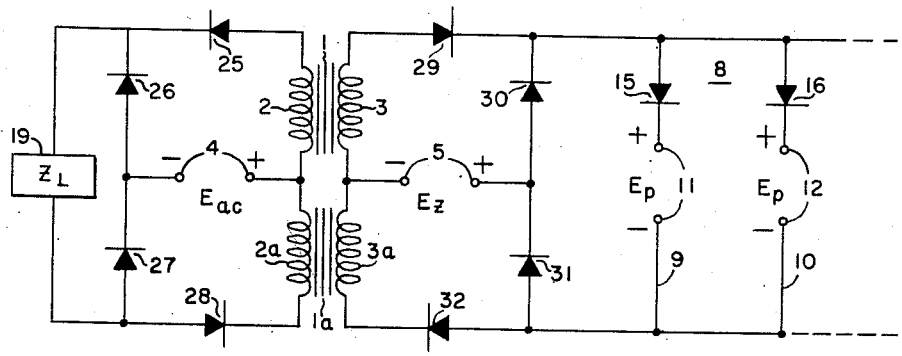
*INVENTOR*
ROBERT A. RAMEY JR.
BY
ATTORNEYS United States Patent Office 2,766,420
Patented Oct. 9, 1956

2,766,420

MAGNETIC COINCIDENCE DETECTOR

Robert A. Ramey, Jr., Pittsburgh, Pa.

Application March 16, 1953, Serial No. 342,763

15 Claims. (Cl. 323—89)

(Granted under Title 35, U. S. Code (1952), sec. 266)

This invention relates to pulse coincidence detectors, and more particularly to coincidence detectors which utilize magnetic circuitry having saturable magnetic core components.

Heretofore, the field of coincidence detection has been reserved almost exclusively to the electronic vacuum tube, especially where the purpose to be served necessitated devices having high speed response characteristics. The reservation of any field to the vacuum tube, however, is not without inherent disadvantages. Many industrial and military applications require the device, in addition to high speed response, to have a robust character, that it be durable, simple and reliable so as to be substantially free from maintenance, etc. In some instances mechanical shock and adverse electrical conditions may be such as to preclude the use of conventional vacuum tube circuits. To fulfill these requirements, the magnetic circuit has characteristics which are eminently suitable while additionally providing a device having complete conductive isolation of input and output circuits.

The primary limitation of the magnetic circuit, which has been responsible for the restricted application of magnetic devices, involves the relatively sluggish time response characteristics as compared with the vacuum tube. A more realistic approach to the mechanics of magnetic circuit operation has shown, however, that time responses of a half-cycle at the operating frequency are easily attained. A rigorous discussion of such high speed circuits may be found in my co-pending application, Serial No. 237,813, filed July 20, 1951, for Magnetic Amplifier Control Circuit, and Serial No. 237,814, filed July 20, 1951, now U. S. Patent No. 2,719,885, for Magnetic Amplifier With High Gain and Rapid Response. A response time characteristic of the order alluded to will be entirely adequate for many purposes.

Accordingly, it is an object of the present invention to provide a new pulse coincidence detector which utilizes magnetic components.

Another object of the present invention is to provide a magnetic coincidence detector which exhibits a time response characteristic of the order of a half-cycle at the operating frequency.

A further object is to provide a coincidence detector of a rugged and simple nature from conventional components which renders the maintenance factor insignificant.

Still another object of the present invention is to provide a coincidence detector wherein the number of input signals, upon the coincidence of which the presence of an output signal depends, may be selected as desired without affecting the remainder of the detector circuit in any degree.

Other objects of the present invention will become apparent from the following detailed description when taken in conjunction with the drawings in which:

Figure 1 is a schematic diagram of a magnetic coincidence detector of the present invention;

Figure 2 illustrates the ideal magnetization loop characteristic of the core material as utilized in the present invention;

Figure 3 is a more detailed schematic diagram of the input circuit of the detector shown in Figure 1;

Figure 4 is a schematic diagram of a variation of the detector circuit of Figure 1, wherein coincidence detection may be had over a complete operational cycle as opposed to the half-cycle response of the detector shown in Figure 1.

Predicating the magnetic circuit to be voltage sensitive, it is assumed that the level of magnetization of a core of saturable magnetic material having high remanence may be determined uniquely from the equation $$e(\text{volts}) = -N\frac{d\phi}{dt}$$

or where the turns $N=1$, $\phi = -\int e\,dt$ volt-seconds. In other words, the time-integral of reactive voltage across the windings wound around a saturable magnetic core determines uniquely the magnetization level of the core. Thus, assuming a saturable core wherein the magnetization level is set at a given level, application of a voltage to the winding wound thereon causes the magnetization level to change in a sense determined by the polarity, and by an amount proportional to the time-integral of the applied voltage. Should the time-integral of voltage be sufficient to cause the magnetization level to reach the saturation level of the core, further application of voltage of the same polarity will cause saturation, or output current to flow in the winding inasmuch as the saturable core device no longer presents a reactive voltage across the winding thereof in opposition to the applied voltage.

In view of the foregoing considerations the objects of the present invention are attained through the use of a magnetic amplifier having a saturable magnetic core on which is wound at least one current carrying winding. Preferably the objects are achieved by providing a saturable core on which are wound a pair of windings, hereinafter referred to as the input and output windings. To these windings are respectively coupled a demagnetizing voltage source and a magnetizing voltage source, the voltages derived therefrom generally being alternating-current of the same frequency and phase. Means are provided for alternately blocking the voltage sources from the windings such that during even half-cycles the magnetizing voltage is applied to the output winding in one sense and during odd half-cycles the demagnetizing voltage is applied to the input winding in the opposite sense whereby the magnetization level of the core is alternately raised from a given level to the saturation level and depressed from the saturation level to the given level. Coupled in series with the demagnetizing voltage source are a plurality of parallel signal input paths to which the signals to be compared in time are respectively fed in opposition to the demagnetizing voltage. In the absence of any one of such input signals, normal demagnetizing action occurs through the path exhibiting no signal voltage, hence, with equal time-integrals of the magnetizing and demagnetizing voltages applied to the respective windings, no appreciable output current is caused to flow in the output winding as the magnetizing voltage is completely absorbed in raising the core magnetization level to the saturation level. Coincidence of the input signals in the respective paths, however, effects a reduction of the demagnetizing voltage applicable to the input winding resulting in output current since the full time-integral of magnetizing voltage in the magnetizing half-cycle is not required before the core is raised to the saturation level, conduction occurring in the output winding upon the continuance of the application of magnetizing voltage to the winding after core saturation. In the output circuit a counter may be caused to operate in response to the flow of output current to register the coincidence of the input signals.

A circuit embracing the principles of the present invention is shown in Figure 1. In this embodiment a saturable magnetic core 1 has wound thereon an output winding 2 and an input winding 3. Respectively coupled to windings 2 and 3 at terminals 4 and 5 are alternating-current magnetizing and demagnetizing voltage sources 6 and 7, respectively denoted $E_{ac}$ and $E_z$. In practice these voltages preferably should not exceed the value which the core 1 can absorb without saturation. Specifically, where the turns ratio $N=1$ of the windings 2 and 3, voltages $E_{ac}$ and $E_z$ are approximately equal in magnitude and of the same frequency and phase and hence, while shown as independent sources, may conveniently be derived from a single power supply source, for example, by transformer connections. More generally, voltages $E_{ac}$ and $E_z$, in relation to the number of turns in the windings, should be such that the time-integral of reactive voltage induced in the windings due to these voltages should be substantially equal over a half-cycle, as will become apparent hereinafter.

Connected in series with demagnetizing voltage source 7 and winding 3 are a plurality of parallel circuit paths generally designated at 8, to which the input signals to be compared in time for coincidence are fed. For simplicity of illustration only two such paths 9 and 10 are shown, but it being understood that the number of paths to be provided should be equal to the number of independent sources supplying the signals, the coincidence of which are to be detected. Each of the paths 9 and 10 include respective input terminals 11 and 12, to which the signal sources 13 and 14 are connected, and respective unilateral impedances 15 and 16, typically shown as rectifiers. It is anticipated, for reasons to be explained, that the signal outputs of sources 13 and 14 are of a constant polarity or that suitable means, not shown, are provided to feed the input signals to terminals 11 and 12 in a given polarity. Rectifiers 15 and 16 serve to prevent the flow of circulating currents in the parallel paths and additionally are so poled relative to the polarity of the signals derived from sources 13 and 14 as to prevent the flow of current from the signal sources 13 and 14 to the input winding.

As previously described, the magnetizing voltage $E_{ac}$ and the demagnetizing voltage $E_z$ are to be applied to the output and input windings 2 and 3 respectively, during alternate half-cycles. In the input circuit, rectifiers 15 and 16 are in series with demagnetizing voltage source 7 and thereby limit the application of voltage $E_z$ to winding 3 to half-cycles. Similarly, unilateral impedance 17, also shown as a rectifier, is connected in series with winding 2 and source 6 in the output circuit whereby alternate half-cycles of the magnetizing voltage $E_{ac}$ are blocked from winding 2, the polarities of voltage sources 6 and 7, rectifiers 15 and 16 being such as to cause the alternate operation as described.

Also provided in series with magnetizing voltage source 6 in the output circuit are terminals 18 to which may be connected any desired utilization device 19, for example, a pulse register or other electrically operated counter, device 19 serving to indicate, total, or otherwise operate on the coincidence pulses fed thereto.

In the operation of the coincidence detector of Figure 1, obviously the magnetic characteristic of core 1 determines to a great extent the operating characteristics of the device. Consideration of the desired operational characteristics will show the most optimum magnetic characteristic of the core to be similar to the substantially rectangular loop type exhibited by materials such as Deltamax, Orthonol, etc. More particularly the core material should have a high characteristic remanence with relatively complete saturation at low levels of magnetomotive force, as shown in Figure 2 which illustrates the magnetic characteristic in terms of flux $\varphi$ and ampereturns NI. Thus, considering the demagnetization half-cycle where the instantaneous polarities of the various parameters of the detector are as illustrated in Figure 1 and that the level of magnetization of core 1 is at the saturation level indicated at A in Figure 2, should there be at least one of respective paths 9—10 which exhibits no voltage in opposition to demagnetizing voltage $E_z$, then all of parallel paths 8 will be effectively short-circuited. Consequently the full time-integral of a half-cycle of $E_z$ is applied across winding 3 thereby to depress the magnetization level of core 1 to a predetermined level B. However, should there be coincidence of signals from sources 13 and 14, the value of $E_z$ applicable to winding 3 will be reduced in proportion to the magnitude of the smallest input signal whereby the magnetization level is depressed only to some intermediate level such as C in Figure 2. During the same half-cycle, magnetizing voltage $E_{ac}$ is blocked from winding 2 by rectifier 17.

In the next succeeding half-cycle of detector operation, with the polarities shown in Figure 1 reversed, rectifiers 15 and 16 block voltage source 7 from winding 3 while magnetizing voltage source 6 tends to drive magnetizing current through the output circuit including winding 2 and utilization device 19 which is designed to have a current-sensitivity just above the small value of magnetizing current. Since the time-integral of magnetizing and demagnetizing voltages applied to the windings are equal, if the magnetization level of core 1 has been set at level B by the demagnetizing voltage $E_z$ as a result of non-coincidence of signals from sources 13 and 14, no saturation current will flow in the output circuit, the full half-cycle of voltage $E_{ac}$ being absorbed in raising the level of magnetization from level B to the saturation level A. On the other hand, if the magnetization level had been set at some intermediate level C as a result of signal coincidence, the core saturates prior to the end of the half-cycle of $E_{ac}$ whereupon the remainder of $E_{ac}$, with the disappearance of reactive voltage across winding 2, then becomes available for actuating utilization device 19.

Coincidence of input signals in the input circuit during the demagnetizing half-cycle results in a reduction in the effectiveness of voltage $E_z$ in demagnetizing the core as has been explained with reference to level C in Figure 2. If the input signals are of equal duration and magnitude as voltage $E_z$, upon coincidence the magnetization level of core 1 will not be shifted from level A since the demagnetizing voltage is effectively cancelled with respect to winding 3. As a result full output current will flow in the output winding in the succeeding half-cycle. For input signals of shorter duration and amplitude than $E_z$, upon coincidence the level of magnetization will be depressed, generally to some intermediate level C as alluded to, it being understood that the shift of the magnetization level from level A will be proportional to the area of overlapping of the coincident input signals in opposition to the demagnetizing voltage $E_z$.

During the demagnetizing half-cycle of detector operation, it should be apparent that a continuous low impedance circuit must be provided to permit the demagnetizing operation as described above. Accordingly, the means for inserting the input signals in the input circuit must be such that terminals 11 and 12 are not open circuits in the absence of input signals at paths 8. In Figure 3 a signal input circuit is shown which provides a continuous low impedance path either in the presence or absence of signals, for example, at terminals 11. Specifically, there is in parallel with terminals 11, to which the input signal is fed, a unilateral impedance 20, shown as a rectifier, poled in opposition to rectifier 15 described hereinbefore. A constant current source, including direct-current source 21 and high impedance 22 in series, is connected across rectifier 20 and supplies to the input signal circuit a small amount of current which is substantially constant and of a value slightly greater than the demagnetizing current. In operation, assuming the absence of an input signal at terminals 11 during the demagnetizing half-cycle, full demagnetizing current is permitted to flow in the input circuit through the constant current source, the excess of current supplied by the constant current source over the required value of demagnetizing current flowing through rectifier 20 in reverse polarity to the demagnetizing current. Upon application of an input signal equal in amplitude and duration to the half-cycle demagnetizing voltage, no demagnetizing current can flow in path 9 because of the existence of the signal voltage therein in opposition to the demagnetizing voltage, the constant current now circulating through the input signal source.

The detector circuit shown in Figure 1 has the limitation that to give rise to an output pulse, the input signals must occur and be coincident in the demagnetizing half-cycle of detector operation inasmuch as voltage source $E_z$ is effective to set the magnetization level of the core during this period. Hence the circuit of Figure 1 has the greatest utility in those applications wherein the input signals to be compared may, or may not, occur at a defined period in a programmed series of events as, for example, in computer systems. The detector of the present invention may be made more general in application by appropriately paralleling two of the single-core detectors of Figure 1 as shown in Figure 4 in which like components are correspondingly numbered.

Accordingly, in the detector of Figure 4 an additional saturable core 1a having respective output and input windings 2a and 3a is provided in parallel with core 1 and windings 2 and 3. In the output circuit the output windings 2 and 2a are placed in adjacent legs of a unilateral impedance bridge circuit which includes rectifiers 25, 26, 27 and 28. The magnetizing voltage $E_{ac}$ is applied across the rectifier bridge at one pair of opposing junctions and utilization device 19 across the other pair of bridge junctions. In the input circuit the input windings 3 and 3a are similarly placed in adjacent legs of a unilateral impedance bridge circuit of rectifiers 29, 30, 31 and 32. The demagnetizing voltage $E_z$ and parallel paths 8 are connected across the input bridge circuit corresponding to the connections of voltage $E_{ac}$ and utilization device 19, respectively, in the output circuit. As thus connected during any given half-cycle of operation magnetizing voltage $E_{ac}$ is being applied to a winding on one of the cores, which is thereby raised to the saturation level, while the demagnetizing voltage $E_z$ is being applied through paths 8 to the input winding on the other of the cores, which is set at a given magnetization level as described in connection with Figure 2. For example, in the positive half-cycle of $E_{ac}$, magnetizing current flows in the output circuit through a path including winding 2, rectifier 25, utilization device 19, and rectifier 27; and demagnetizing current flows in the input circuit through a path including winding 3a, rectifier 32, parallel paths 8, and rectifier 30. Therefore, input signals may occur at any time in a cycle of operation and be detected upon coincidence, since demagnetizing voltage $E_z$ is active in the input circuit throughout the entire cycle.

Although certain specific embodiments have been shown and described many modifications and variations may be made by those skilled in the art without departing from the spirit of the present invention which is not to be limited except insofar as is necessary by the scope of the disclosure.

The invention described herein may be manufactured and used by or for the Government of the United States of America for governmental purposes without the payment of any royalties thereon or therefor.

What is claimed is:

1. Apparatus for detecting the coincidence of a plurality of signals comprising a high remanence saturable magnetic core, an alternating voltage supply means, a magnetization control circuit coupled to said alternating voltage supply means operative during odd half-cycles thereof to shift the magnetization level of said core to saturation, a demagnetization control circuit coupled to said alternating voltage supply means operative during even half-cycles thereof to depress the magnetization level of said core to a finite level below the saturation level, and attenuator control means in said demagnetization control circuit responsive to the simultaneous occurrence of said plurality of signals to reduce the effectiveness of said demagnetization control circuit.

2. Apparatus for detecting the coincidence of a plurality of signals comprising a high remanence saturable magnetic core, an alternating voltage supply means, a magnetization control circuit coupled to said alternating voltage supply means operative during odd half-cycles thereof to shift the magnetization level of said core to saturation, a demagnetization control circuit coupled to said alternating voltage supply means operative during even half-cycles thereof to depress the magnetization level of said core to a finite level below the saturation level, and a plurality of parallel conductance paths in said demagnetization control circuit responsive to the simultaneous occurrence of said plurality of signals to reduce the effectiveness of said demagnetization control circuit.

3. Apparatus for detecting the coincidence of a plurality of signals comprising a saturable magnetic core, means including first and second voltage sources operative in first and second periods respectively for causing the magnetization level of said core to be alternately elevated from a predetermined level to the saturation level and depressed from the saturation level to said predetermined level respectively, and a plurality of parallel signal input paths in series with said second voltage source, said plurality of signals being fed to said input paths respectively in opposition to said second voltage.

4. Apparatus for detecting the coincidence of a plurality of signals comprising a saturable magnetic core having first and second windings wound thereon, means including a voltage source in series with said first winding for applying thereto a first voltage in a first phase of detector operation to cause said core to proceed to saturation, means including a voltage source and a plurality of parallel conductive paths in series with said second winding for applying thereto a second voltage in a second phase of detector operation to cause said core to deviate from saturation, and means for respectively coupling said signals in said paths in opposition to said second voltage, the coincidence of said signals in said paths effecting a reduction in the value of said second voltage applicable to said second winding.

5. Apparatus for detecting the coincidence of a plurality of signals comprising a saturable magnetic core having first and second windings wound thereon, a first alternating-current voltage source in series with said first winding, means for limiting the application of said first voltage to said first winding to odd half-cycles, the time-integral of an odd half-cycle being sufficient to cause said core to reach the saturation level from a given level of magnetization, a second alternating-current voltage having substantially the same frequency and phase as said first voltage and in series with said second winding, means for limiting the application of said second voltage to said windings to even half-cycles, the time-integral of an even half-cycle being sufficient to cause said core to reach said given level from the saturation level of magnetization, a plurality of parallel conductive paths in series with said second source, and respective terminal means in said paths for receiving respectively said plurality of signals, said signals being injected in said paths in opposition to said second voltage.

6. Coincidence detection apparatus comprising a saturable magnetic core having first and second windings wound thereon, a first alternating-current voltage source connected to said first winding for applying a voltage thereto to cause said core to proceed to saturation, means for limiting the application of said first voltage to said first winding to even half-cycles, a second alternating-current voltage source connected to said second winding for applying a voltage thereto to cause said core to deviate from saturation, said second voltage source having a frequency and phase substantially the same as said first source, a plurality of unidirectional-conductive parallel paths in series with said second source and arranged to limit the application of said second voltage to said second winding to odd half-cycles, and respective input signal terminals in said paths, input signals being respectively applied in said paths in opposition to said second voltage.

7. Coincidence detection apparatus comprising a saturable magnetic core having first and second windings wound thereon, means including a first voltage source connected to said first winding for applying a voltage thereto to cause said core to proceed to saturation in a first phase of detector operation, a series circuit including said second winding, a second voltage source for applying a voltage to said winding to cause said core to deviate from saturation, means for limiting the application of said second voltage to said winding to a second phase of detector operation, and a plurality of parallel conductive paths having respective input signal terminals therein, said input signals being applied in said paths so as to be in opposition to said second voltage in said series circuit.

8. Coincidence detection apparatus comprising a saturable magnetic core having first and second windings wound thereon, a first series circuit including said first winding, an alternating-current magnetizing voltage source, a unilateral impedance for limiting the application of said voltage to said first winding to even half-cycles, and output pulse utilization means, a second series circuit including said second winding, an alternating-current demagnetizing voltage source of substantially the same frequency and phase as said first source, parallel conductive paths having respective signal input circuits therein, the input signals being applied in said paths so as to be in opposition to said demagnetizing voltage in said second series circuit, and means for limiting the application of said second voltage to said second winding to odd half-cycles.

9. Coincidence detection apparatus substantially as set forth in claim 6 wherein said signal input circuits each include a unilateral impedance connected in series in said conductive paths and poled in opposition to even half-cycles of said demagnetizing voltage, a constant current source connected in parallel with said unilateral impedance for supplying a small amount of circulating current in said input circuit, and signal input leads for feeding input signals across said unilateral impedance.

10. Coincidence detection apparatus comprising a saturable magnetic core having first and second windings wound thereon, a first series circuit including said first winding, an alternating-current magnetizing voltage source, means for limiting the application of said voltage to said first winding to even half-cycles, and output pulse utilization means, and a second series circuit including said second winding, an alternating-current demagnetizing voltage source of substantially the same frequency and phase as said first source, a plurality of parallel conductive paths having respective unilateral impedances therein, said impedances being arranged to limit the application of said demagnetizing voltage to said second winding to odd half-cycles, respective signal input circuit in said paths for receiving input signals in said second series circuit in opposition to said demagnetizing voltage source, the concidence of said signals in said paths effecting a reduction in the value of said demagnetizing voltage applicable to said second winding.

11. Coincidence detection apparatus for detecting the coincidence of a plurality of signals comprising a pair of saturable magnetic cores, an output and an input winding wound on each of said cores, and output circuit including said output windings, an alternating-current magnetizing voltage source, first unilateral impedance means for blocking the application of said magnetizing voltage to alternate output windings in successive half-cycles, and output pulse utilization means in series with said magnetizing voltage, and an input circuit including said input windings, an alternating-current demagnetizing voltage source substantially of the same frequency and phase as said magnetizing voltage source, second unilateral impedance means for blocking the application of said demagnetizing voltage to alternate input windings in successive half-cycles, demagnetizing voltage being applied to the input winding on one of said cores and magnetizing voltage being applied to the output winding on the other of said cores during any given half-cycle thereof, and a plurality of parallel conductive paths having respective signal input terminals therein, said signals being applied in said paths in like polarity, said paths being arranged in said input circuit such that coincidence of said signals in said paths presents a signal voltage in opposition to the application of said demagnetizing voltage to said input windings.

12. Apparatus for detecting the coincidence of a plurality of signals comprising a saturable magnetic core, a magnetization control circuit coupled to said core and operative to shift the magnetization level of said core to saturation, a demagnetization control circuit coupled to said core and operative to depress the magnetization level of said core to a finite level below the saturation level, and control means in said demagnetization control circuit responsive to the simultaneous occurrence of said plurality of signals to reduce the effectiveness of said demagnetization control circuit.

13. Apparatus for detecting the coincidence of a plurality of signals comprising a saturable magnetic core, a magnetization control circuit coupled to said core and operative to shift the magnetization level of said core to saturation during a first phase of operation, a demagnetization control circuit coupled to said core and operative during a second phase of operation to depress the magnetization level of said core to a finite level below the saturation level, and control means in said demagnetization control circuit responsive to the simultaneous occurrence of said plurality of signals to reduce the effectiveness of said demagnetization control circuit.

14. Apparatus for detecting the coincidence of a plurality of signals comprising a saturable magnetic core, a magnetization control circuit coupled to said core and operative to shift the magnetization level of said core to saturation during a first phase of operation, a demagnetization control circuit coupled to said core and operative during a second phase of operation to depress the magnetization level of said core to a finite level below the saturation level, control means in said demagnetization control circuit responsive to the simultaneous occurrence of said plurality of signals to reduce the effectiveness of said demagnetization control circuit, and means responsive to said core saturation to indicate said coincidence.

15. Apparatus for detecting the coincidence of a plurality of signals comprising a saturable magnetic core, a first control circuit coupled to said core and operative to shift the magnetization level of said core to saturation, said first control circuit having unidirectional conducting means to render it inoperative to demagnetizing currents, a second control circuit coupled to said core and operative to depress the magnetization level of said core to a finite level below the saturation level, said second control circuit having unidirectional conducting means to render it conductive only to demagnetizating currents, and control means in said second control circuit responsive to the simultaneous occurrence of said plurality of signals to reduce the effectiveness of said second control circuit.

References Cited in the file of this patent

UNITED STATES PATENTS 2,652,501    Wilson _____ Sept. 15, 1953